United States Patent

[11] 3,571,492

| [72] | Inventors | August C. Clark<br>Manhattan;<br>Charles Christianson, Bronx; Julius Kaminetsky, Forest Hills, N.Y.; Edward F. Duffy, Rockville, Md. |
|---|---|---|
| [21] | Appl. No. | 810,265 |
| [22] | Filed | Mar. 25, 1969 |
| [45] | Patented | Mar. 16, 1971 |
| [73] | Assignee | The United States of America as represented by the Secretary of the Navy |

[54] R.F. HIGH VOLTAGE INSULATION LINK
4 Claims, 3 Drawing Figs.

[52] U.S. Cl. .................................................. 174/178, 174/208, 174/209
[51] Int. Cl. ..................................................... H01b 17/02
[50] Field of Search ........................................... 174/140.1, 176, 177, 178, 179, 207, 208, (G.F.), 209; 156/169; 161/143, 144; 59/84

[56] References Cited
UNITED STATES PATENTS

| 2,977,406 | 3/1961 | Scott | 174/177 |
| 3,228,481 | 1/1966 | Eldred | 156/169X |
| 3,325,584 | 6/1967 | Herzig | 174/179X |
| 3,460,628 | 8/1969 | Tankersley | 174/177UX |

FOREIGN PATENTS

| 538,014 | 7/1941 | Great Britain | 174/179 |
| 827,047 | 2/1960 | Great Britain | 174/176 |
| 881,566 | 11/1961 | Great Britain | 174/177 |

Primary Examiner—Laramie E. Askin
Attorneys—Louis A. Miller, Louis B. Applebaum and Ernest F. Weinberger ABSTRACT: A high R.F. voltage, low capacitance insulation link having a high breaking strength comprising a pair of galvanized steel thimbles or saddles joined by a pair of overlayed fiberglass loops. The loops are circumferentially filament wound epoxy impregnated S-type fiberglass roving with a layer of silicone rubber therebetween. The inner layer or loop abuts the peripheral surface of the saddles and is bonded thereto by an epoxy resin. All the inner voids of the saddle are filled with epoxy filler and the exposed surfaces of the loops are coated with a flexible epoxy paint. Additionally, the saddles are provided with inspection holes aligned with the loops.

Patented March 16, 1971  3,571,492

INVENTORS.
AUGUST C. CLARK
CHARLES CHRISTIANSON
JULIUS KAMINETSKY
EDWARD F. DUFFY

BY Ernest J Weinberger
    Louis B. Applebaum
              ATTORNEYS

Patented March 16, 1971

INVENTORS.
AUGUST C. CLARK
CHARLES CHRISTIANSON
JULIUS KAMINETSKY
EDWARD F. DUFFY

BY Ernest J Weinberger

ATTORNEYS

R.F. HIGH VOLTAGE INSULATION LINK

BACKGROUND OF THE INVENTION

1. Field of the Invention

The present invention relates to high strength, structural, weight-carrying members and more particularly pertains to electrically insulated links for use on cranes wherein the links exhibit high insulation for radio frequencies and low capacitance.

2. Description of the Prior Art

In the field of high voltage insulated links, it has been the general practice to employ interlocking metallic loops to provide a fail-safe characteristic while using various combinations of rubber and melamine insulators to insure both personnel and equipment electrical safety. Such devices have proved unsatisfactory in that they only provide a voltage reduction of approximately 6:1 while exhibiting a capacitance range of 65—225 microfarads for frequencies up to 30 megahertz. Additionally, low resilience and excessive deformation and elongation under load while subjected to extreme environmental conditions make them hazardous in use.

SUMMARY OF THE INVENTION

The general purpose of this invention is to provide a high strength mechanical link that has all the advantages of similarly employed prior art devices and has none of the above-described disadvantages. To attain this, the present invention provides a unique structural arrangement of components and materials which includes a pair of galvanized steel saddles linked together by a pair of circumferential bands of preimpregnated epoxy-fiberglass roving with the inner band epoxy bonded to the abutting saddle surface. The exposed surfaces of the bands are coated with a flexible epoxy paint and the voids of the saddle filled with epoxy filler. The saddle faces are provided with openings which serve as inspection holes.

An object of this invention is to provide a high strength, low capacitance, high insulation, RF voltage, mechanical link which is simple, inexpensive, fail-safe and reliable.

Another object is to provide an electrically insulated high strength member for use under tension in a structural device whereby the personnel operating such device will be protected against electrical hazards.

Other objects and many of the attendant advantages of this invention will be readily appreciated as the same becomes better understood by reference to the following detailed description when considered in connection with the accompanying drawings.

BRIEF DESCRIPTION OF A PREFERRED EMBODIMENT

Figure 1:
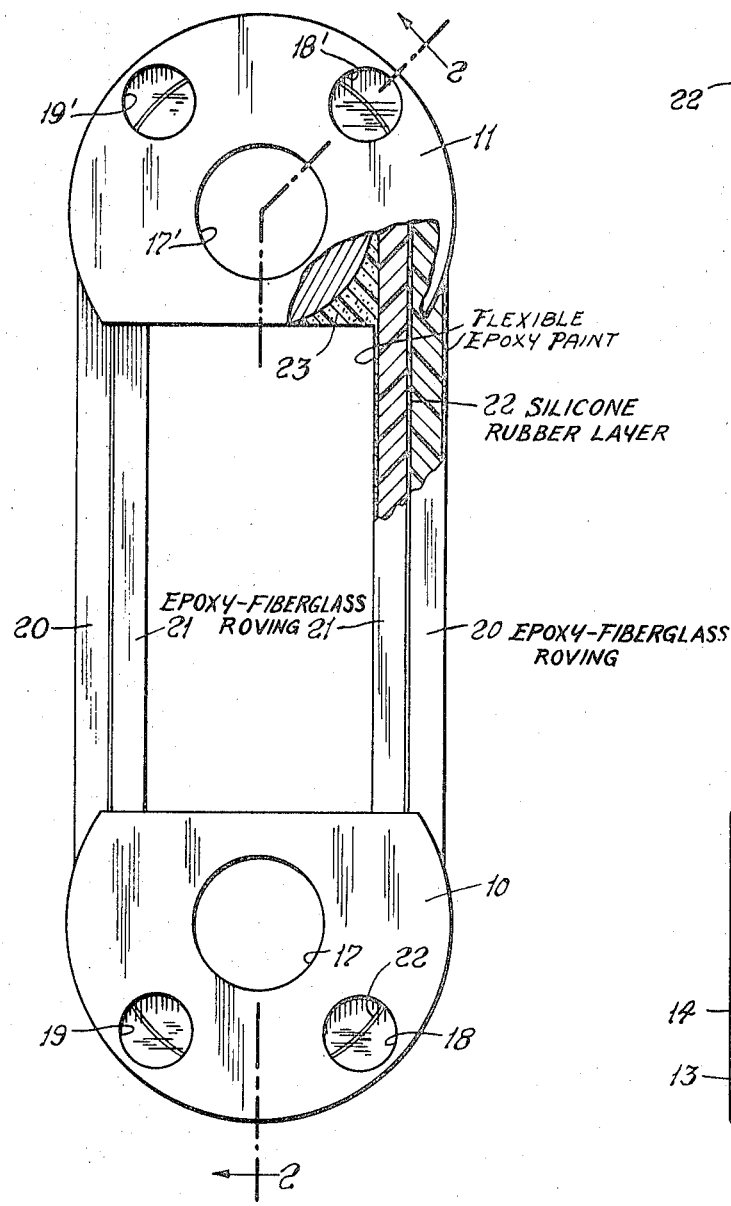
FIG. 1 is a front elevation of an insulated link made in accordance with the principle of this invention.
Figure 2:
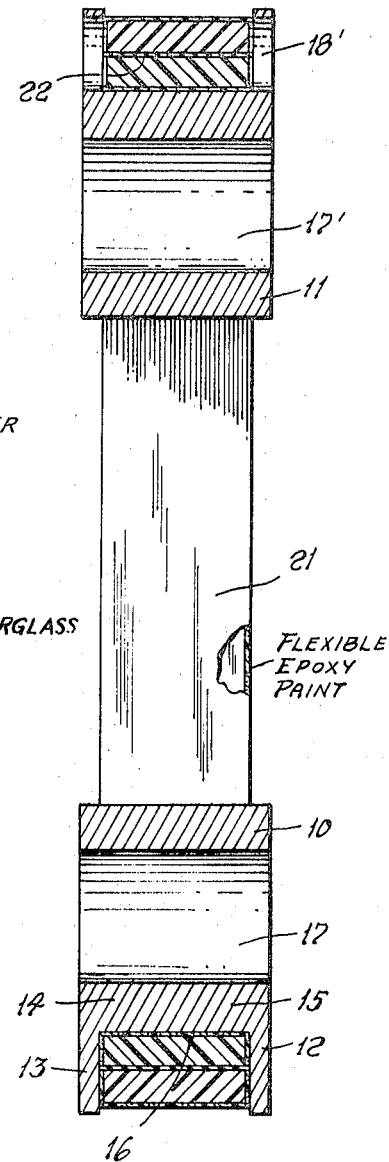
FIG. 2 is a sectional view taken along line 2-2 of FIG. 1 with like parts designated with primed reference numerals.

In the illustrated embodiment of FIGS. 1 and 2, a pair of thimbles or saddles 10 and 11 are each essentially an integral pair of semicircular outer plates 12 and 13 having inwardly extending integral sections 14 and 15. This structure is thereby provided with an annular recess 16 formed between the plates 12 and 13. Opening 17 extends through the saddle from one plate to the other so as to provide a means for coupling of the link to other elements. Each of the saddles is also provided with a pair of inspection passageways 18 and 19 through the plates and aligned with the recess 16 to permit visual inspection of the recess and the contents thereof. These saddles are generally fabricated of hot dipped galvanized steel and are standard commercially available items. Disposed therebetween and structurally integral for conveying tensional forces between the saddles are a pair of overlaying fiberglass bands 20 and 21. Specifically, bands 20 and 21 are of a preimpregnated epoxy-fiberglass roving circumferentially wound on the saddles within the recess 16. The bands are visible through the inspection holes 18 and 19 and their physical condition can be readily ascertained. The bands are physically and structurally separate and interposed therebetween in a silicone rubber layer 22. Since each of the bands has sufficient tensile strength to support the load independently then, clearly, a fail-safe structure is evident. In addition, the physical condition of each band may be directly ascertained under load by visual inspection through the holes 18 and 19 while the link is physically employed. In order to fully protect and minimize flexing of the bands under alternate loading and unloading, the interstices formed at the exit areas of the saddle are completely filled, as at 23, with an epoxy that is both strong and resistant to environmental atmospheric conditions. After the link structure has been fabricated, it is coated with a flexible epoxy paint except for the openings 18 and 19.

Figure 3:
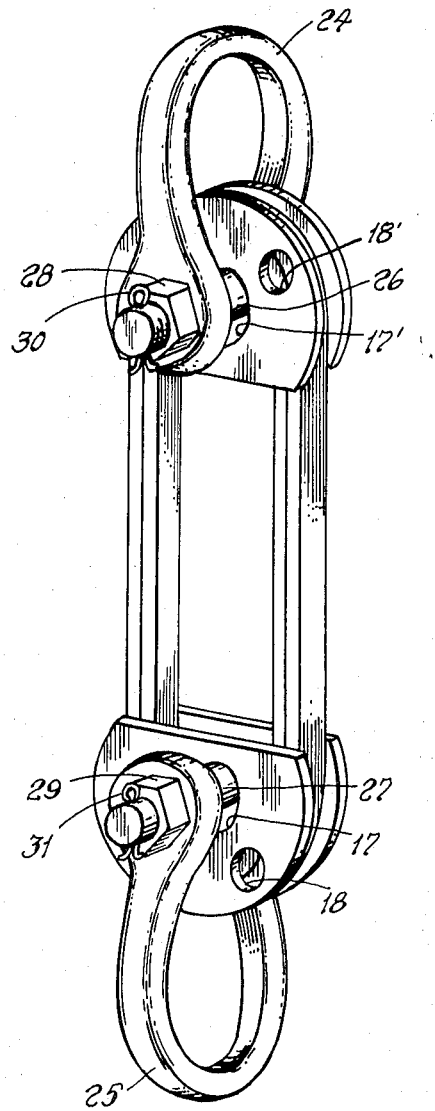
FIG. 3 is a perspective view of an arrangement illustrating the relative positioning and disposition of the link when employed in a lifting function.

FIG. 3 illustrates an approved coupling arrangement for the link wherein a pair of shackles 24 and 25 are joined to the link. A bolt 26 (27) is passed through the shackle apertures and through the link opening 17 while nut 28 (29) which is threaded thereon confines the shackle on the bolt. Cotter pin 30 (31) prevents the nut from disengagement. Under this arrangement the insulating link is free to rotate about the bolt in the vertical plane.

The link described hereinabove can be fabricated in almost any size, and is also quite useful to replace presently used ceramic insulators. Additionally, such a link has found application in situations where high electrical resistance, low capacitance, high tensile strength and ruggedness are required, together with a fail-safe feature. Elimination of personnel shock hazard by the link provides a high degree of safety and reliability.

I claim:

1. An electrically insulating structural strength member link which comprises:
    a pair of spaced apart semicircular platelike support saddles each having:
        a peripheral recess thereabout;
        a central aperture therethrough from face to face;
        a pair of overlaying loop bands mechanically joining said saddles and disposed in said recesses;
        said bands being circumferentially filament wound epoxy impregnated fiberglass roving; and
        a silicone rubber layer interposed between said bands along their abutting surfaces.

2. The link according to claim 1 wherein each of said saddles is provided with an inspection opening through the face thereof in alignment with said recess.

3. The link according to claim 2 further including an epoxy filler disposed in the interstices formed between said bands and said saddles.

4. The link according to claim 3 wherein the exposed surfaces of said bands except those at said inspection openings are coated with an epoxy paint.